US008637187B2

(12) United States Patent
Fuse et al.

(10) Patent No.: US 8,637,187 B2
(45) Date of Patent: Jan. 28, 2014

(54) NEGATIVE ELECTRODE MATERIAL FOR LITHIUM SECONDARY BATTERY, METHOD FOR PRODUCING SAME, NEGATIVE ELECTRODE FOR LITHIUM SECONDARY BATTERY USING SAME AND LITHIUM SECONDARY BATTERY

(75) Inventors: Tooru Fuse, Inashiki-gun (JP); Hiroyuki Uono, Inashiki-gun (JP); Keita Yamaguchi, Inashiki-gun (JP); Tomiyuki Kamada, Inashiki-gun (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1277 days.

(21) Appl. No.: 11/630,470

(22) PCT Filed: Jun. 24, 2005

(86) PCT No.: PCT/JP2005/011641
§ 371 (c)(1),
(2), (4) Date: Feb. 6, 2007

(87) PCT Pub. No.: WO2006/003849
PCT Pub. Date: Jan. 12, 2006

(65) Prior Publication Data
US 2008/0274406 A1 Nov. 6, 2008

(30) Foreign Application Priority Data
Jun. 30, 2004 (JP) ................................. 2004-193359

(51) Int. Cl.
*H01M 4/02* (2006.01)
*H01M 4/13* (2010.01)
*H01M 4/58* (2010.01)
(52) U.S. Cl.
USPC ..................... 429/231.8; 429/209; 429/218.1
(58) Field of Classification Search
USPC ..................................................... 429/231.8
See application file for complete search history.

(56) References Cited

U.S. PATENT DOCUMENTS

2002/0061445 A1* 5/2002 Kitagawa et al. .......... 429/231.8
2003/0190523 A1* 10/2003 Omaru et al. ................. 429/199

FOREIGN PATENT DOCUMENTS

| EP | 1 005 097 A1 | 5/2000 |
| EP | 1 361 194 A1 | 11/2003 |
| JP | 7 245098 | 9/1995 |
| JP | 10 334915 | 12/1998 |
| JP | 11 25979 | 1/1999 |
| JP | 2000 223120 | 8/2000 |
| JP | 3188032 | 5/2001 |
| JP | 2002-222650 | 8/2002 |
| JP | 2003 168433 | 6/2003 |
| JP | 2003-173778 | 6/2003 |
| JP | 2004-214192 | 7/2004 |
| JP | 2005-353345 | 12/2005 |

OTHER PUBLICATIONS

IUPAC Compendium of Chemical Terminology, 2nd Edition (1997).*
Office Action issued Feb. 8, 2011, in Japanese Patent Application No. 2005-184856, (with English translation).
Supplementary European Search Report issued Oct. 7, 2011, in European Patent Application No. 05765121.8.

* cited by examiner

*Primary Examiner* — Barbara Gilliam
*Assistant Examiner* — Steven Scully
(74) *Attorney, Agent, or Firm* — Oblon, Spivak, McClelland, Maier & Neustadt, L.L.P.

(57) ABSTRACT

A negative-electrode material is provided that can be produced at a low cost and yields a lithium secondary battery with an excellent balance of various battery characteristics even when used in high electrode densities.
It has a graphite powder with a tap density of 0.80 g/cm$^3$ or higher and 1.35 g/cm$^3$ or lower, an amount of surface functional groups, O/C value, of 0 or larger and 0.01 or smaller, a BET specific surface area of 2.5 m$^2$/g or larger and 70 m$^2$/g or smaller, a Raman R value of 0.02 or larger and 0.05 or smaller.

9 Claims, No Drawings

NEGATIVE ELECTRODE MATERIAL FOR LITHIUM SECONDARY BATTERY, METHOD FOR PRODUCING SAME, NEGATIVE ELECTRODE FOR LITHIUM SECONDARY BATTERY USING SAME AND LITHIUM SECONDARY BATTERY

TECHNICAL FIELD

The present invention relates to a negative-electrode material for a lithium secondary battery and a method of producing the material, and also to a negative electrode for a lithium secondary battery and a lithium secondary battery each employing the material. More particularly, the invention relates to a negative-electrode material for a lithium secondary battery, which material is made of a graphite powder and provides an excellent balance of various battery characteristics even when used in high electrode densities, and to a method of producing the material, and also to a negative electrode for a lithium secondary battery and a lithium secondary battery each employing the material.

BACKGROUND ART

Miniaturization of electronic devices in recent years increases the demand for secondary batteries with high capacities. Attention is being given to nonaqueous-solvent lithium secondary batteries, which have higher energy densities compared to nickel-cadmium and nickel-hydrogen batteries. Although a lot of studies have already been made to increase battery capacity, demand for advanced battery characteristics urges further increase in battery capacity.

Materials that have been examined for their applications to negative-electrode materials for lithium secondary batteries include amorphous carbons, artificial graphites, and natural graphites.

The need for further increase in battery capacity involves establishing a simple, inexpensive method of producing a material that requires only a small magnitude of pressing load to be applied during electrode formation and that can be used in high electrode densities.

In contrast to the artificial graphites, natural graphites have been widely used on the grounds that they can exhibit large discharge capacities close to the theoretical capacity due to their well-developed graphite crystal structures, that they require only a small magnitude of pressing load to be applied during electrode formation, and that they are inexpensive. Having excellent properties as mentioned above, however, natural graphites still require further studies for the purpose of establishing a simple, inexpensive method of producing a negative-electrode material that can be used in high electrode densities in view of increasing battery capacity.

Under the circumstances, Patent Document 1 discloses that a highly-crystalline natural graphite is subjected to purification treatment in an atmosphere of nitrogen gas or argon gas at a temperature of 2400° C. or higher to thereby produce a natural graphite negative-electrode material with excellent cycle characteristics and storage characteristics.

Patent Document 2 discloses that a natural graphite or artificial graphite having high crystallinity is subjected to mechanical-energy treatment to be made into roundish particles whose crushed surfaces are relatively isotropic, thereby producing an electrode that secures high packing efficiency, has large capacity, and is excellent in load characteristics and cycle characteristics. The document also discloses that when the product of the mechanical-energy treatment exhibits a true density of lower than 2.25 g/cm$^3$ and has insufficient crystallinity, the product is then heat-treated at 2000° C. or higher so as to raise its crystallinity.

Patent Document 3 discloses that a natural graphite having an average diameter within a predetermined range is subjected to reheat treatment at a temperature of 2000° C. or higher such that the reheat-treated product exhibits a Raman R value and a peak half-value width each within a predetermined range in accordance with Raman spectroscopy employing argon-ion laser light, thereby producing a negative-electrode material with excellent load characteristics.

[Patent Document 1] Japanese Patent No. 3188032
[Patent Document 2] Japanese Patent Application Laid-Open Publication No. 2000-223120
[Patent Document 3] Japanese Patent Application Laid-Open Publication No. H11-25979

DISCLOSURE OF THE INVENTION

Problem to Be Solved by the Invention

Further increase in battery capacity requires a negative-electrode material that can be used in higher electrode densities, for example, 1.6 g/cm$^3$ or higher. However, a negative electrode with such a high electrode density involves the problems of 1) to 4).

1) The negative electrode increases its irreversible capacity due to reaction with a liquid electrolyte and promotes consumption of lithium in a positive-electrode active material, thereby reducing the battery capacity.
2) The negative electrode reduces its pore volume and brings about a reduction in load characteristics.
3) Graphite particles in the negative electrode are likely to be oriented parallel with a current collector, generating graphite intercalation compounds with lithium to accelerate swelling of the electrode. As a result, the amount of the active material that can be packed in a unit volume decreases, thereby reducing the battery capacity.
4) Disintegration of surface crystal of the active material brings about reaction with a liquid electrolyte and promotes gas generation, which causes swelling of the battery and retention of gas between the electrodes, resulting in a decrease in effective reaction area to reduce the battery capacity.

Accordingly, in order to further increase the capacity of a lithium secondary battery, a negative-electrode material is required not only to exhibit larger capacity but also to be usable in higher electrode densities; a strongly desired negative-electrode material is the one that can be used even in higher electrode densities to provide a lithium secondary battery with an excellent balance of various battery characteristics, such as stability of charge-discharge efficiency, stability of load characteristics, and suppression of battery swelling and gas generation increase during battery charging.

By contrast, according to the art of Patent Document 1, when a natural graphite such as a flaky graphite is used in high electrode densities without undergoing spheroidization treatment, the electrode has such a small amount of pores that the crystal is likely to be oriented in one direction, causing a decline in load characteristics. Patent Document 1 is totally silent about how to resolve the problem.

According to the art of Patent Document 2, spheroidization treatment of a natural or artificial graphite with high crystallinity may cause an increase in the Raman R value, especially when the graphite crystal on the particle surface is damaged.

The spheroidized product therefore has a larger BET specific surface area and higher reactivity with liquid electrolyte, bringing about a decline in charge-discharge efficiency and an increase in gas generation.

Patent Document 2 also discloses that a graphite with a true density of lower than 2.25 g/cm$^3$ and low crystallinity should be subjected to heat treatment at 2000° C. or higher to raise its crystallinity. However, the document is totally silent about the necessity of heat treatment for a graphite having a high true density of i.e. 2.25 g/cm$^3$ or higher after spheroidization, and also silent about the amount of surface functional groups of the graphite material.

According to the art of Patent Document 3, when a flaky natural graphite having high crystallinity is used, the resultant electrode active material has a low orientation ratio, being unsatisfactory in view of suppressing battery swelling during battery charging. Namely, when a conventional graphite material, even with high crystallinity and a large capacity, is used as a negative-electrode active material in high electrode densities, for example, 1.6 g/cm$^3$ or higher, the resultant electrode has such a small amount of pore that the crystal is likely to be oriented in one direction. The art is therefore incapable of simultaneously achieving high charge-discharge efficiency, high load characteristics, control of swelling, and reduction in the amount of gas generation during battery charging.

The present invention has been made in view of the above problems: An objective of the present invention is to provide a negative-electrode material that is made of graphite powder and, even when used in high electrode densities, can produce a lithium secondary battery having an excellent balance of various battery characteristics, e.g. requiring only a small magnitude of pressing load for electrode formation, having large discharge capacity and high charge-discharge efficiency, being excellent in load characteristics, exhibiting only a small amount of swelling, and generating only a small amount of gas during battery charging. Other objectives of the present invention are to provide an efficient, inexpensive method of producing the negative-electrode material, and to provide a negative electrode for a lithium secondary battery and a lithium secondary battery each employing the material.

Means for Solving the Problem

The inventors carried out an earnest study on negative-electrode materials made of graphite powder, and have finally found that a graphite powder with a tap density, a BET specific surface area, and a true density each within a predetermined range can be employed as a negative-electrode material that, even when used in high electrode densities, can produce a lithium secondary battery having an excellent balance of various battery characteristics, e.g. requiring only a small magnitude of pressing load for electrode formation, having large discharge capacity and high charge-discharge efficiency, being excellent in load characteristics, exhibiting only a small amount of swelling, and generating only a small amount of gas during battery charging. The inventors have also found that the negative-electrode material can be produced stably with efficiency and at a low cost by a method in which a natural graphite having a tap density, a BET specific surface area, and a true density each within a predetermined range is heat-treated at a temperature within a predetermined range. Thus, the inventors have achieved the present invention.

An aspect of the present invention provides a negative-electrode material for a lithium secondary battery, comprising a graphite powder (A) having a tap density of 0.8 g/cm$^3$ or higher and 1.35 g/cm$^3$ or lower, an amount of surface functional groups, O/C value, of 0 or larger and 0.01 or smaller, a BET specific surface area of 2.5 m$^2$/g or higher and 7.0 m$^2$/g or lower, and a Raman R value of 0.02 or larger and 0.05 or smaller.

The amount of surface functional groups, O/C value, and the Raman R value are measured according to the following methods.

Amount of Surface Functional Groups O/C Value:

The amount of surface functional groups, O/C value, is an atomic concentration ratio O/C (atomic concentration of O/atomic concentration of C) obtained from peak areas of spectra of C1s and O1s according to X-ray photoelectron spectroscopy.

Raman R Value:

The Raman R value is an intensity ratio R(R=I$_B$/I$_A$) between the intensity I$_A$ of a peak P$_A$ of about 1580 cm$^{-1}$ and the intensity I$_B$ of a peak P$_B$ of about 1360 cm$^{-1}$ according to Raman spectroscopy.

Another aspect of the present invention provides a method of producing a negative-electrode material for a lithium secondary battery, wherein a natural graphite having a tap density of 0.8 g/cm$^3$ or larger and 1.35 g/cm$^3$ or smaller, a BET specific surface area of 3.5 m$^2$/g or larger and 11.0 m$^2$/g or smaller, and a true density of 2.25 g/cm$^3$ or higher is heat-treated at a temperature of 1600° C. or higher and 3200° C. or lower to produce a graphite powder (C) having an amount of surface functional groups, O/C value, of 0.01 or lower.

Still another aspect of the present invention provides a negative electrode for a lithium secondary battery, comprising: a current collector; and an active material layer, formed on the current collector, containing either the negative-electrode material mentioned above or a negative-electrode material produced according to the method mentioned above.

Still another aspect of the present invention provides a lithium secondary battery comprising: a positive electrode and a negative electrode capable of intercalating and deintercalating lithium ions; and an electrolyte; wherein the negative electrode is the negative electrode mentioned above.

Advantageous Effects of the Invention

The negative-electrode material for a lithium secondary battery according to the present invention can provide a lithium secondary battery with an excellent balance of various battery characteristics even when used in high electrode densities.

Also, the method of producing a negative-electrode material for a lithium secondary battery according to the present invention, since employing a natural graphite as a target material for heat treatment, requires fewer steps and can produce the aforementioned negative-electrode material for a lithium secondary battery efficiently with high yield and a low cost, being highly useful industrially.

BEST MODES FOR CARRYING OUT THE INVENTION

The present invention will be explained below in detail. However, the present invention is not limited to the following explanation but can be embodied with various modifications unless deviated from the gist of the present invention.

[1. Negative Electrode Material]

A negative-electrode material for a lithium secondary battery according to the present invention (herein after called "the negative-electrode material of the present invention") is characterized by graphite powder (A) which satisfies the following properties. The graphite powder (A) may be used singly, or may be used as a mixture with another carbon material (B), as will be explained later.

[1-1. Graphite Powder]

Graphite powder (A) used as the negative-electrode material of the present invention (herein after called "the graphite material of the present invention") has a tap density of 0.8 g/cm$^3$ or larger and 1.35 g/cm$^3$ or smaller, an amount of surface functional groups, O/C value, of 0 or larger and 0.01 or smaller, a BET specific surface area of 2.5 m$^2$/g or larger and 7.0 m$^2$/g or smaller, and a Raman R value of 0.02 or larger and 0.05 or smaller.

(Shape)

The graphite material of the present invention is not limited particularly in its shape, examples of which are spherical and oval shapes.

(Degree of Circularity)

The graphite material of the present invention is not limited particularly in its degree of circularity, which is within a range of usually 0.90 or larger, preferably 0.92 or larger, and usually 0.96 or smaller, preferably 0.95 or smaller. A material whose degree of circularity is below the range may have such a small amount of space between the particles as to reduce load characteristics. On the other hand, a material whose degree of circularity exceeds the range may require strong or long-time spheroidization for its production, unfavorably requiring high production cost.

The degree of circularity (the circumference of a circle of equivalent area/the diameter of a circle having the projected area of each particle) can be measured using a flow particle image analyzer (e.g. FPIA manufactured by Sysmex Industrial Corporation) according to the following procedure: 0.2 g of a measurement target (i.e. graphite material herein) is mixed with an aqueous solution (about 50 ml) of 0.2 volume % of polyoxyethylene (20) sorbitan monolaurate as a surfactant. After the mixture is irradiated with ultrasonic waves of 28 kHz in an output of 60 W for a minute, the particles whose diameters are within a range of 10 to 40 μm are measured with a specified detection range of from 0.6 to 40 μm to thereby determine the degree of circularity.

(Tap Density)

The graphite material of the present invention has a tap density within a range of usually 0.8 g/cm$^3$ or larger, preferably 0.9 g/cm$^3$ or larger, further preferably 0.95 g/cm$^3$ or larger, and usually 1.35 g/cm$^3$ or smaller, preferably 1.2 g/cm$^3$ or smaller. A material whose tap density is below the range as a negative-electrode material can hardly be used in high packing densities, having difficulty in producing a battery with large capacity. On the other hand, a material whose tap density exceeds the range provides the electrode with such a small amount of space between the particles that sufficient conductivity is hardly secured between the particles, having difficulty in obtaining desired battery characteristics.

Tap density can be measured according to the following procedure: A measurement target (i.e. graphite material herein) is dropped through a 300 μm-aperture sieve into a 20 cm$^3$-volume tapping cell to fill up the cell, which is then subjected to 1000-times tapping with 10 mm strokes using a powder-density measurement device (e.g. Tap Denser manufactured by Seishin Enterprise Co., Ltd.) to thereby determine the tap density.

(Amount of Surface Functional Groups, O/C Value)

The amount of surface functional groups, O/C value, of the graphite material of the present invention measured in accordance with X-ray photoelectron spectroscopy (XPS) is usually 0 or larger and usually 0.01 or smaller, preferably 0.004 or smaller. A material whose O/C value exceeds the range may show high reactivity with a liquid electrolyte due to the excessive amount of functional groups on the particle surface, possibly bringing about an increase in gas generation.

The amount of surface functional groups, O/C value, means the atomic ratio of oxygen to carbon existing on the surface of a material such as a graphite material, indicating the amount of functional groups existing on the surface, such as carboxyl group, phenolic hydroxy group, and carbonyl group. A carbon material with a large amount of surface functional groups, O/C value, has oxygen-containing surface functional groups bound to, for example, the end faces of carbon crystallites on the particle surface.

The amount of surface functional groups, O/C value, of a graphite material can be measured according to the following procedure: C1s and O1s spectra are measured in accordance with X-ray photoelectron spectroscopy, and based on the peak areas of the spectra, the atomic concentration ratio between C and O, i.e. O/C {(atomic concentration of O)/(atomic concentration of C)} is obtained as the O/C value.

A specific, although non-restrictive, example of the measurement procedure is as follows.

The measurement of X-ray photoelectron spectroscopy is carried out using an X-ray photoelectron spectrometer (e.g. ESCA manufactured by ULVAC-PHI, Inc.) according to the following procedure: A measurement target (i.e. graphite material herein) is placed on a sample stage such that the target surface become flat, after which C1s (280 to 300 eV) and O1s (525 to 545 eV) spectra are measured through multiplex measurement using an aluminum Kα-ray source as an X-ray source. After charge correction in which the C1s peak top is adjusted to 284.3 eV, the peak areas of the C1s and O1s spectra are calculated and then multiplied by an apparatus sensitivity coefficient to determine the surface atomic concentrations of C and O, respectively. The ratio between the atomic concentrations of C and O, i.e. O/C {(atomic concentration of O)/(atomic concentration of C)}, is calculated and obtained as the amount of surface functional groups, O/C value, of the graphite material.

(BET Specific Surface Area)

The specific surface area of the graphite material of the present invention measured in accordance with BET method is within a range of usually 2.5 m$^2$/g or larger, preferably 3.0 m$^2$/g or larger, and usually 7.0 m$^2$/g or smaller, preferably 5.5 m$^2$/g or smaller. A material whose specific surface area is below the range is, when used as a negative-electrode material, likely to worsen lithium acceptability during charging and to cause lithium deposition on the electrode surface, being unfavorable in view of safety. On the other hand, a material whose specific surface area exceeds the range is, when used as a negative-electrode material, likely to increase the reactivity with a liquid electrolyte and to generate a lot of gas, having difficulty in providing a favorable battery.

The BET specific surface area can be measured using a surface area meter (e.g. an automatic surface area analyzer manufactured by Ohkura Riken Co., Ltd.) according to the following procedure: A measurement target (i.e. graphite material herein) is predried in the flow of nitrogen at 350° C. for 15 minutes, and then measured in accordance with nitrogen adsorption BET one-point method using gas flow method with a gas mixture of nitrogen and helium, whose relative pressure of nitrogen to atmospheric pressure is correctly adjusted to 0.3, to thereby determine the BET specific surface area.

(Raman R Value, Raman Half-Value Width)

The Raman R value of the graphite material of the present invention measured in accordance with Raman method is within a range of usually 0.02 or larger, preferably 0.03 or larger, and usually 0.05 or smaller, preferably 0.04 or smaller.

A material whose Raman R value is below the range may have such a high crystallinity at the particle surface that when used in high densities, the crystal is likely to be oriented parallel with the electrode, possibly bringing about a decline in load characteristics. On the other hand, a material whose Raman R value exceeds the range may have such a disordered crystal on the particle surface that the reactivity with a liquid electrolyte is likely to increase, possibly bringing about a decrease in efficiency or an increase in gas generation.

The Raman half-value width of the graphite material of the present invention is not limited particularly, although being within a range of usually 18.0 or larger, preferably 19.0 or larger, and usually 22.5 or smaller, preferably 21.5 or smaller. A material whose Raman half-value width is below the range may have such a high crystallinity at the particle surface that when used in high densities, the crystal is likely to be oriented parallel with the electrode, possibly bringing about a decline in load characteristics. On the other hand, a material whose Raman half-value width exceeds the range may have such a disordered crystal on the particle surface that the reactivity with a liquid electrolyte is likely to increase, possibly bringing about a decrease in efficiency or an increase in gas generation.

Raman measurement can be carried out using a Raman spectrometer (e.g. a Raman spectrometer manufactured by JASCO Corporation) according to the following procedure: A sample being a measurement target (i.e. graphite material herein) is naturally dropped into a measurement cell to fill up the cell with the sample, which is then measured by irradiating the sample surface in the cell with an argon-ion laser beam while rotating the cell in a plane perpendicular to the laser beam.

Based on the Raman spectrum, the intensity $I_A$ of a peak $P_A$ at about 1580 cm$^{-1}$ and the intensity $I_B$ of a peak $P_B$ at about 1360 cm$^{-1}$ are measured, and the intensity ratio R ($R=I_B/I_A$) is calculated and obtained as the Raman R value of the graphite material.

Also, based on the Raman spectrum, the half-value width of the peak $P_A$ at about 1580 cm$^{-1}$ is measured and obtained as the Raman half-value width of the graphite material.

Examples of Raman measurement conditions herein are as follows.

Wavelength of argon ion laser: 514.5 nm
Laser power on the sample: 15 to 25 mW
Resolution: 10 to 20 cm$^{-1}$
Measurement range: 1100 cm$^{-1}$ to 1730 cm$^{-1}$
Analysis of R value and half-value width: Background treatment, smoothing treatment (simple average, convolution 5 points)

(Volume-Based Average Diameter, Ratio between 90% Diameter and 10% Diameter)

The volume-based average diameter of the graphite material of the present invention is not limited particularly, although within a range of usually 10 μm or larger, preferably 14 μm or larger, and usually 50 μm or smaller, preferably 40 μm or smaller. A material whose volume-based average diameter is below the range is, when used as a negative-electrode material, likely to aggregate and to form agglomerates when kneaded with a binder, so that the electrode produced through coating may become nonuniform. On the other hand, a material whose volume-based average diameter exceeds the range is likely to cause unevenness when coated as a negative-electrode material for electrode production.

The volume-based ratio of 90% diameter to 10% diameter ($d_{90}/d_{10}$) of the graphite material of the present invention is not limited particularly, although within a range of usually 1.5 or larger, preferably 1.7 or larger, and usually 4.0 or smaller, preferably 2.5 or smaller. A graphite powder whose $d_{90}/d_{10}$ ratio is below the range may have such a narrow particle-size distribution that the electrical contacts between the graphite particles are difficult to establish, so that cycle characteristics may deteriorate. On the other hand, a material whose $d_{90}/d_{10}$ ratio exceeds the range may not have a sufficient amount of pores in an electrode, having difficulty in providing preferable battery characteristics.

The volume-based average diameter can be measured according to the following procedure: a graphite powder is mixed with an aqueous solution (about 1 ml) of 2 volume % of polyoxyethylene (20) sorbitan monolaurate as a surfactant, and the mixture is measured by means of a laser-diffraction type particle-size distribution analyzer (e.g. LA-700 manufactured by Horiba Ltd.) with deionized water as a dispersion medium to thereby determine volume-based average diameter (median diameter). The ratio of 90% diameter to 10% diameter ($d_{90}/d_{10}$) can be obtained as the ratio ($d_{90}/d_{10}$) between the volume-based 90% and 10% diameters measured according to the above-mentioned procedure.

(Inter layer Spacing)

The interlayer spacing $d_{002}$ of the (002) planes of the graphite material of the present invention measured in accordance with X-ray diffraction is not limited particularly, although being usually 0.3356 nm or smaller, preferably 0.3355 nm or smaller. A material whose interlayer spacing $d_{002}$ exceeds the limit, i.e. which is of inferior crystallinity, may have a reduced discharge capacity per unit weight of the active material when used in electrode production. On the other hand, the lower limit of the interlayer spacing $d_{002}$ is usually 0.3354 nm or larger as a theoretical limitation.

The crystallite size $Lc_{004}$ along the c axis of the graphite material of the present invention measured in accordance with X-ray diffraction is not limited particularly, although being usually 90 nm or larger, preferably 100 nm or larger. A material whose crystallite size $Lc_{004}$ is below the limit may have a small discharge capacity per unit weight of the active material when used in electrode production.

The interlayer spacing $d_{002}$ and crystallite size $Lc_{004}$ in accordance with X-ray diffraction can be measured according to Gakushin method, which is stipulated by the Carbon Society of Japan. Gakushin method does not discriminate values of 100 nm (1000 Å) or larger, and indicates such values with ">1000 (Å)".

(Orientation Ratio of Active Material in Electrode Form)

When the graphite material of the present invention is used as the active material to form an electrode whose electrode density is within 1.63±0.05 g/cm$^3$, i.e. a range of between 1.58 g/cm$^3$ and 1.68 g/cm$^3$, the orientation ratio of the active material in the electrode is within a range of usually 0.02 or higher, preferably 0.03 or higher, further preferably 0.04 or larger, and usually 0.09 or smaller, preferably 0.08 or smaller. An electrode whose active-material orientation ratio is below the range, when used in battery production, may cause swelling during battery charging, having difficulty in increasing battery capacity per unit volume of the electrode. On the other hand, in an electrode whose active-material orientation ratio exceeds the range, the active material is likely to have low crystallinity and require a large amount of pressing load in electrode formation, having difficulty in increasing packing density of the electrode after pressing process.

Herein, the active-material orientation ratio in the electrode means a value indicating the degree of orientation of graphite crystal hexagon netplane along the thickness of the electrode. A higher orientation ratio represents a lower degree of orientation of the hexagon netplanes of graphite crystal in the particles.

The active-material orientation ratio in the electrode is measured according to the following procedure.

(1) Production of Electrode:

A graphite material is mixed with an aqueous solution of CMC (carboxymethyl cellulose) as a thickener and an aqueous solution of SBR (styrene-butadiene rubber) as a binder resin in such a manner that each of the CMC and SBR contents becomes 1 weight % relative to the total weight of the mixture of graphite material, CMC, and SBR after being dried. The mixture is stirred and made into the form of slurry, which is then applied on a copper foil of 18 μm in thickness with a doctor blade. The thickness for application is defined by the gap of the blade, which is adjusted in such a manner that the electrode weight (exclusive of the copper foil) will be 10 mg/cm$^2$ after being dried. The electrode is then dried at 80° C., and pressed in such a manner that the electrode density (exclusive of the copper foil) becomes within 1.63±0.05 g/cm$^3$.

(2) Measurement of Active-Material Orientation Ratio:

The electrode after pressed is subjected to the measured of the active-material orientation ratio by means of X-ray diffraction. The method of measurement is not limited particularly, although a standard method is as follows: An X-ray diffraction chart indicating the (110) and (004) planes is obtained, from which chart the peaks are isolated by fitting with asymmetric Peason VII as a profile function. The intensities of the isolated peaks are integrated for the (110) planes and the (004) planes. Based on the integrated intensities, the ratio represented by (the integrated intensity of the (110) planes)/(the integrated intensity of the (004) planes) is calculated and obtained as the active-material orientation ratio in the electrode.

The measurement conditions for X-ray diffraction herein are the following, where 2θ represents the angle of diffraction:

Target:
  Cu(Kα-ray) graphite monochrometer
Slit:
  Divergent slit=1 degree
  Receiving slit=0.1 mm
  Scattering slit=1 degree
Measurement region and step angle per measurement time:
  (110) plane:
  76.5 degrees<2θ<78.5 degrees, 0.0 degree/3 seconds
  (004) plane:
  53.5 degrees<2θ<56.0 degrees, 0.01 degree/3 seconds
Sample preparation:
  The electrode is fixed to a glass plate with a double-faced tape of 0.1 mm in thickness.

According to the above-explained method, an electrode formed such that the electrode density is within 1.63±0.05 g/cm$^3$ can be measured for the active-material orientation ratio by means of X-ray diffraction.

(Discharge Capacity)

<Discharge Capacity in the Form of Lithium Secondary Battery>

When the graphite material of the present invention is used as an active material and formed into an active-material layer on a current collector to produce a negative electrode, a lithium secondary battery using the resultant negative electrode exhibits a discharge capacity of, for example, 355 mAh/g or larger, preferably 360 mAh/g or larger. A battery whose discharge capacity is below the limit has difficulty in improving the battery capacity. Preferably the discharge capacity should be as large as possible, although the maximum is usually about 370 mAh/g.

The method of measuring the discharging capacity is not limited particularly. A standard method of measurement is explained below.

First, an electrode employing a graphite material is prepared, by using a copper foil as a current collector and forming an active material layer on the current collector. The active material layer is formed from a mixture of the graphite material and styrene-butadiene rubber (SBR) as a binder resin. The amount of the binder resin is adjusted to 1 weight % relative to the weight of the electrode. The electrode density is adjusted to a value within a range of 1.45 g/cm$^3$ or higher and 1.95 g/cm$^3$ or lower.

The discharge capacity is measured through a charge-discharge test using a bipolar coin cell including the produced electrode and a counter electrode made of metal lithium.

The bipolar coin cell may include any liquid electrolyte, examples of which include: a liquid mixture of ethylene carbonate (EC) and diethyl carbonate (DEC) at a DEC/EC ratio of 1/1 to 7/3 by volume; and a liquid mixture of ethylene carbonate and ethyl methyl carbonate (EMC) at a EMC/EC ratio of 1/1 to 7/3 by volume. The bipolar coin cell may also include any separator, an example of which is a polyethylene sheet of 15 μm to 35 μm in thickness.

The thus-prepared bipolar coin cell is subjected to a charge-discharge test to determine the discharge capacity. Specifically, the lithium counter electrode is charged to 5 mV with the current density of 0.2 mA/cm$^2$, then charged with the constant voltage of 5 mV until the current value reaches 0.02 mA to dope the negative electrode with lithium, and discharged to 1.5V with the current density of 0.4 mA/cm$^2$. This charge-discharge cycle is repeated three times, and the discharging value on the third cycle is obtained as the discharging capacity.

[1-2. Method of Producing Graphite Powder]

The graphite powder (A) (the graphite material of the present invention) can be produced according to any methods without any limitation. A preferred example among those will be explained below.

Specifically, the negative-electrode material for a lithium secondary battery according to the present invention is produced by a method (herein after called "the method of production of the present invention") in which a natural graphite with a tap density of 0.8 g/cm$^3$ or higher and 1.35 g/cm$^3$ or lower, a BET specific surface area of 3.5 m$^2$/g or larger and 11.0 m$^2$/g or smaller, and a true density of 2.25 g/cm$^3$ or higher is heat-treated at a temperature of 1600° C. or higher and 3200° C. or lower to produce a heat-treated graphite powder having an amount of surface functional groups, O/C value, of 0.01 or smaller. Preferably, the natural graphite being a raw material is a spheroidized graphite powder.

(Starting Material)

The method of production of the present invention employs a natural graphite as the starting material.

Specifically, natural graphites can be classified, according to their properties, under the categories of flaky graphite (flake graphite), vein graphite (crystalline graphite) and soil graphite (amorphous graphite) (see the GRAPHITE section of "HUNRYUTAI PROCESS GIJUTSU SYUSEI", published by SANGYO GIJUTSU CENTER, 1974, and "HANDBOOK OF CARBON, GRAPHITE, DIAMOND AND FULLERENES", published by Noyes Publications). Vein graphite is the highest degree of graphitization, 100%; flaky graphite has the second, 99.9%; and soil graphite the lowest, 28%. The quality of a natural graphite depends mainly on the place of its production or the vein from which it originates. Flaky graphite is produced mainly in Madagascar, China, Brazil, Ukraine, and Canada. Vein graphite is produced mainly in Sri Lanka. Soil graphite is produced mainly in the Korean Peninsula, China, and Mexico. Among these natural graphites, flaky graphite and vein graphite are preferred as a raw material for the present invention because of their advantages of, for example, high degrees of graphitization and low contents of impurities.

(Ash Content of Starting Material)

A preferred starting material for the method of production of the present invention can be obtained by purifying a natural graphites as mentioned above to deash it through acid treatment, e.g. treatment with hydrochloric acid or hydrogen fluoride, and/or heating treatment at 2000° C. or higher. Since the treatment can eliminate impurities almost completely, the thus-treated graphite can be preferably used as a raw material for the present invention.

The ash content of the deashed natural graphite is not limited particularly, although being within a range of usually 0.00 weight % or higher and usually 0.20 weight % or lower, preferably 0.15 weight % or lower. A graphite whose ash content exceeds the range may worsen storage characteristics due to self discharge. The ash content can be measured according to, for example, the method defined by JIS M8812.

(True Density of Natural Graphite Before Heat Treatment)

The true density of the natural graphite before the heat treatment is usually 2.25 g/cm$^3$ or higher. The true density hardly changes through the heat treatment explained below. A graphite whose true density is below the limit may not improve its crystallinity after the heat treatment, possibly bringing about an undesired reduction in discharge capacity per unit weight of the active material when used for electrode production. On the other hand, the lower limit of the true density is usually 2.27 g/cm$^3$ or lower as a theoretical limitation.

(Tap Density of Natural Graphite before Heat Treatment)

The tap density of the natural graphite before the heat treatment is within a range of usually 0.8 g/cm$^3$ or higher, preferably 0.9 g/cm$^3$ or higher, further preferably 0.95 g/cm$^3$ or higher, and usually 1.35 g/cm$^3$ or lower, preferably 1.2 g/cm$^3$ or lower. Although the tap density may change through the heat treatment explained below, the use of a natural graphite whose tap density is within the range can bring the tap density of the heat-treated graphite within the aforementioned range. A natural graphite whose tap density is below the range before the heat treatment, when used as an active material after the heat treatment, hardly increases packing density, having difficulty in producing a battery with a large capacity. On the other hand, a natural graphite whose tap density exceeds the range before the heat treatment, when used as an active material after the heat treatment, may yield an excessive amount of space between the particles in the electrode and hardly secure conductivity between the particles, having difficulty in providing favorable battery characteristics.

The method of measurement for tap density should be in accordance with the explanation above.

(BET Specific Surface Area of Natural Graphite before Heat Treatment)

The BET specific surface area of the natural graphite before the heat treatment is within a range of usually 3.5 m$^2$/g or larger, preferably 4.5 m$^2$/g or larger, and usually 11.0 m$^2$/g or smaller, preferably 9.0 m$^2$/g or smaller, further preferably 7.0 m$^2$/g or smaller. Although the BET specific surface area becomes small through the heat treatment explained below, the use of a natural graphite whose BET specific surface area is within the range can bring the BET specific surface area of the heat-treated natural graphite within the aforementioned range. A natural graphite whose specific surface area before the heat treatment is below the lower limit of the range is, when used as a negative-electrode material after the heat treatment, likely to worsen lithium acceptability during charging and to bring about lithium deposition on the electrode surface, being unfavorable in view of safety. On the other hand, a natural graphite whose specific surface area before the heat treatment exceeds the upper limit of the range is, when used as a negative-electrode material after the heat treatment, likely to raise reactivity with a liquid electrolyte and to increase gas generation, having difficulty in producing a favorable battery.

The method of measurement for BET specific surface area should be in accordance with the explanation above.

(Raman R Value and Raman Half-Value Width of Natural Graphite before Heat Treatment)

The Raman R value of the natural graphite before the heat treatment is not limited particularly, although being within a range of usually 0.10 or larger, preferably 0.20 or larger, and usually 0.35 or smaller, preferably 0.30 or smaller. A natural graphite whose R value is below the range may increase crystallinity at the particle surface of the graphite material after the heat treatment so excessively that the crystal tends to be oriented parallel with the electrode made in high densities, possibly bringing about a decline in load characteristics. On the other hand, a natural graphite whose R value exceeds the range may not be modified in its crystal on the particle surface of the graphite material through the subsequent heat treatment to a sufficient degree, increasing the reactivity with a liquid electrolyte and possibly bringing about a decline in efficiency or an increase in gas generation.

The Raman half-value width of the natural graphite before the heat treatment is not limited particularly, although being within a range of usually 21.0 or larger, preferably 21.5 or larger, and usually 26.0 or smaller, preferably 24.0 or smaller. A natural graphite whose half-value width is below the range may increase crystallinity at the particle surface of the graphite material after the heat treatment so excessively that the crystal tends to be oriented parallel with the electrode when made in high densities, possibly bringing about a decline in load characteristics. On the other hand, a natural graphite whose half-value width exceeds the range may not be modified in its crystal on the particle surface of the graphite material through the subsequent heat treatment to a sufficient degree and leave disordered crystal, increasing the reactivity with a liquid electrolyte and possibly bringing about a decline in efficiency or increase in gas generation.

The method of measurement for Raman R value and Raman half-value width should be in accordance with the explanation above.

(Inter layer Spacing of Natural Graphite before Heat Treatment)

The interlayer spacing $d_{002}$ of the (002) planes of the natural graphite before the heat treatment, measured in accordance with X-ray diffraction, is not limited particularly, although being usually 0.3357 nm or smaller, preferably 0.3355 nm or smaller. A natural graphite whose interlayer spacing $d_{002}$ exceeds the limit, i.e. which is inferior in crystallinity, may not receive sufficient modifications of the particle crystal through the subsequent heat treatment, possibly reducing discharge capacity per unit weight of the active material when used in electrode production. On the other hand, the lower limit of the interlayer spacing $d_{002}$ is usually 0.3354 nm or larger, as a theoretical limitation.

The crystallite size $Lc_{004}$ along the c axis of the natural graphite before the heat treatment, measured in accordance with X-ray diffraction, is not limited particularly, although being usually 90 nm or larger, preferably 100 nm or larger. A natural graphite whose crystallite size $Lc_{004}$ is below the limit may not receive sufficient modifications of the particle crystal through the subsequent heat treatment, possibly reducing discharge capacity per unit weight of the active material when used in electrode production.

The method of measurement for interlayer spacing should be in accordance with the explanation above.

(Degree of Circularity of Natural Graphite before Heat Treatment)

The degree of circularity of the natural graphite before the heat treatment is not limited particularly, although being within a range of usually 0.90 or higher, preferably 0.92 or higher, and usually 0.96 or lower, preferably 0.95 or lower. A graphite material whose degree of circularity is below the range may, when used as a negative-electrode material after the heat treatment, bring about a reduction in the amount of space between the particles and a decline in load characteristics. On the other hand, a graphite material whose degree of circularity exceeds the range may require strong or long-time spheroidization treatment for its production; a lot of impalpable powder produced during the spheroidization must be removed later, unfavorably increasing the production cost.

The method of measurement for degree of circularity should be in accordance with the explanation above.

(Production of Natural Graphite before Heat Treatment)

The method for producing a natural graphite whose tap density before the heat treatment is within the aforementioned range is not limited particularly, but is preferably a spheroidized natural graphite obtained through spheroidization treatment. The treatment can be carried out by, for example, a machine that repetitively applies mechanical action to the particles, mainly by impulse force and also by other forces such as compression, friction, and sharing force, as well as interaction of the particles. A preferred machine has a rotor with a number of blades arranged inside a casing and, through high-speed revolution of the rotor, produces mechanical action such as impulse compression, friction, or sharing force on carbon material fed inside the machine, thereby carrying out surface treatment. In addition, the machine preferably has a mechanism that repetitiously provides mechanical action by circulating a carbon material. An example of such a preferred machine is a hybridization system manufactured by Nara Machinery Co., Ltd.

(Heat Treatment of Natural Graphite)

The natural graphite having a tap density within the aforementioned range is subjected to heat treatment according to the following procedure. The crystal on the particle surface of the natural graphite may be disordered, especially when the spheroidization treatment is carried out; heat treatment serves to reorganize the disordered crystal on the graphite particle surface and to reduce the Raman R value and the BET specific surface area.

Temperature condition for the heat treatment is not limited particularly, although being within a range of usually 1600° C. or higher, preferably 2000° C. or higher, further preferably 2500° C. or higher, and usually 3200° C. or lower, preferably 3100° C. or lower. Temperatures being below the range may be insufficient to reorganize the crystal on the graphite particle surface disordered during spheroidization treatment, so that the Raman R value and the BET specific surface area cannot be reduced to a favorable degree. On the other hand, temperatures exceeding the range tend to bring about an unfavorable increase in the amount of graphite sublimation excessively.

The time period during which the temperature should be retained within the aforementioned range for heat treatment is not limited particularly, but is usually 10 seconds or longer and 72 hours or shorter.

The heat treatment can be carried out in an atmosphere of inert gas, such as nitrogen gas, or in a nonoxidizing atmosphere of gas generating from the graphite material. The apparatus used for the heat treatment is not limited particularly, examples of which apparatus include a shuttle kiln, a tunnel kiln, an electric furnace, a lead hammer kiln, a rotary kiln, a direct-type electric kiln, an Acheson furnace, a resistance-heating furnace, and an induction-heating furnace.

(Control of Surface Functional Groups of Graphite)

The amount of surface functional groups, O/C value, of graphite can be controlled, for example, through the control of the oxygen content in the atmosphere during heat treatment. Specifically, when the graphite powder after the heat treatment is subjected to surface modification such as oxidation treatment, the amount of surface functional groups, O/C value, should be adjusted to 0.01 or smaller through the control of, for example, the oxygen content in the atmosphere, the treatment temperature, and the treatment time.

The amount of surface functional groups, O/C value, of the natural graphite before the heat treatment is not limited particularly, although being usually 0.07 or smaller, preferably 0.04 or smaller. If the amount of surface functional groups, O/C value, exceeds the range, it is difficult to make the amount of surface functional groups, O/C value, after the heat treatment within the aforementioned range.

The amount of surface functional groups, O/C value, of the graphite powder after the heat treatment is not limited particularly, although being usually 0.01 or smaller, preferably 0.004 or smaller. If the amount of surface functional groups, O/C value, exceeds the range, the reactivity with a liquid electrolyte may increase due to the excessive amount of functional groups on the particle surface, possibly bringing about an increase in the amount of gas generation.

(Other Treatments)

Besides the aforementioned treatments, a variety of treatments can be carried out, such as classification treatment, unless impairing the effects of the present invention. The classification treatment removes excessively rough or fine particles to adjust the particle size to the intended particle diameter after the graphitization treatment.

An apparatus used for the classification treatment is not limited particularly, examples of which apparatus are: dry-type sieves such as a rotary sieve, a swing sieve, a gyratory sieve, and a turning sieve; dry-type air classifiers such as a gravity classifier, an inertial classifier, and a centrifuge classifier (e.g., Classifier or Cyclone); and wet-type sieves such as a mechanical wet classifier, a hydraulic power classifier, a precipitation classifier, and a centrifuge wet classifier.

The classification treatment may be carried out before the heat treatment, or at any other time, e.g. after the heat treatment. Alternatively, classification treatment can be omitted. However, in view of the productivity of the graphite powder negative-electrode material, it is preferred to carry out the classification treatment right after the spheroidization treatment and before the heat treatment.

[1-3. Mixing Graphite Powder with Other Carbon Material]

The aforementioned graphite powder (A) (alternatively, the graphite powder obtained after the heat treatment in the aforementioned method of production of the present invention, which powder is called as the graphite powder (C)) can be used as a negative-electrode material. In this case, any one graphite powder (A) (or graphite powder (C)) may be used singly, or any two or more graphite powders (A) (or graphite powders (C)) may be used in combination at any ratios. Alternatively, two or more of the negative-electrode materials, i.e. graphite powders (A) (or graphite powders (C)) may be mixed with any one or more carbon materials (B) and used as a negative-electrode material.

When the graphite powder (A) (or graphite powder (C)) is mixed with a carbon material (B), the mixing ratio of (B) to the total amount of (A) and (B) (or to the total amount of (C) and (B)) is within a range of usually 5 weight % or higher, preferably 20 weight % or higher, and usually 95 weight % or lower, preferably 80 weight % or lower. The use of a carbon material (B) in a mixing ratio below the range is unfavorable because it can hardly derive the expected effects from the addition of (B). On the other hand, the use of a carbon material (B) in an amount that exceeds the range is also unfavorable because it may impair the properties of graphite powder (A) (or graphite powder (C)).

The carbon material (B) to be used is a material selected from the group consisting of natural graphite, artificial graphite, amorphous-material-covered graphite, resin-covered graphite, and amorphous carbon. These materials may be used any one singly, or any two or more in combination at any ratios. Examples of natural graphite include purified flaky graphite and spheroidized graphite. The volume-based average diameter of the natural graphite is within a range of usually 8 μm or larger, preferably 12 μm or larger, and usually 60 μm or smaller, preferably 40 μm or smaller. The BET specific surface area of the natural graphite is within a range of usually 4 m$^2$/g or larger, preferably 4.5 m$^2$/g or larger, and usually 7 m$^2$/g or smaller, preferably 5.5 m$^2$/g or smaller.

Examples of artificial graphite include: particles obtained by compounding coke powder or natural graphite with a binder; and particles obtained through calcination and graphitization of graphite-precursor particles of a single kind as a powdery state.

Examples of amorphous-material-covered graphite include: particles obtained by covering natural graphite or artificial graphite with an amorphous precursor, followed by calcination; and particles obtained by covering natural graphite or artificial graphite with an amorphous material by means of CVD.

Examples of resin-covered graphite include particles obtained by covering natural graphite or artificial graphite with a polymer material, followed by drying.

Examples of amorphous carbon include: particles obtained through calcination of bulk mesophase; and particles obtained through infusiblization and calcination of a carbon precursor.

Preferred among these as the carbon material (B) is at least one artificial-graphite carbon material (herein after called "carbon material (b)") selected from the group consisting of:
(i) carbon materials in which natural graphite particles are partially or wholly covered with a heat-treated binder being a graphitizable carbonaceous material; and
(ii) carbon materials in which natural graphite particles are bound to each other with a heat-treated binder being a graphitizable carbonaceous material.

The binder contained in the carbon material (b) may be any graphitizable carbonaceous material, preferred examples of which include, but not limited to, condensed-polycyclic aromatic compounds derived from petroleum and coal, ranging from soft pitch to hard pitch.

Examples of the natural graphite particles contained in the carbon material (b) include purified flaky graphite and spheroidized graphite. The volume-based average diameter of the natural graphite should be within a range of usually 10 μm or larger, preferably 12 μm or larger, and usually 50 μm or smaller, preferably 30 μm or smaller. The BET specific surface area of the natural graphite should be within a range of usually 4 m$^2$/g or larger, preferably 4.5 m$^2$/g or larger, and usually 10 m$^2$/g or smaller, preferably 6 m$^2$/g or smaller.

When the carbon material (B) is the aforementioned carbon material (b), the ratio of the carbon material (b) to the total amount of the graphite powder (A) (or the graphite powder (C)) and the carbon material (b) is usually 10 weight % or higher, preferably 30 weight % or higher, more preferably 50 weight % or higher, most preferably 60 weight % or higher, and usually 90 weight % or lower, more preferably 80 weight % or lower. When two or more carbon materials (b) are used in combination, the total of these materials should meet the range.

When a carbon material (B) is mixed with the graphite powder (A) (or the graphite powder (C)), it can be selected without limitation. For example, the carbon material (B) can be selected in view of improving conductivity to thereby improve cycle characteristics and charge acceptance, reducing irreversible capacity, and improving pressing efficiency, in accordance with the circumstances.

The apparatus used for mixing the graphite powder (A) (or the graphite powder (C)) with the carbon material (B) is not limited particularly, examples of which apparatus include: rolling mixers such as a cylinder mixer, a twin-cylinder mixer, a double-cone mixer, a cube mixer, and a hoe mixer; and stationary mixers such as a spiral mixer, a ribbon mixer, a Muller mixer, a helical-flight mixer, a pugmill mixer, and a fluidized mixer.

[1-4. Others]

Explained above, the negative-electrode material according to the present invention (a graphite powder (A) or graphite powder (C), or a mixture of the graphite powder and a carbon material (B)) is preferably used as a negative-electrode material for a lithium secondary battery having a positive electrode and a negative electrode capable of intercalating and deintercalating lithium ions and a liquid electrolyte. Even when used in high electrode densities, the negative-electrode material according to the present invention can produce a lithium secondary battery requiring only a small magnitude of pressing load for electrode formation, having large discharge capacity and high charge-discharge efficiency, being excellent in load characteristics, exhibiting only a small amount of swelling and generating only a small amount of gas during battery charging, i.e. having an excellent balance of various battery characteristics. In addition, the method of producing a negative-electrode material for a lithium secondary battery according to the present invention carries out heat treatment on natural graphite as raw material. The method can therefore efficiently produce the negative-electrode material mentioned above through a few steps with high yield and a low cost, and is highly useful industrially.

When a negative-electrode material according to the present invention is used for producing a negative electrode for a lithium secondary battery, no particular limitation is imposed for selecting the method of production or selecting other materials, as well as for selecting the components required for assembling a lithium secondary battery, such as a positive electrode and a liquid electrolyte. The following explanation will be made in detail for examples of a negative electrode for a lithium secondary battery and a lithium secondary battery employing a negative-electrode material according to the present invention, although these examples should not limit the materials and the method of production.

[2. Negative Electrode for Lithium Secondary Battery]

A negative electrode for a lithium secondary battery can be produced by forming, on a current collector, a layer containing a negative-electrode material according to the present invention as an active material (negative electrode layer).

The negative electrode can be produced according to a known method. In an example of such a method, at least one negative-electrode active material (a negative-electrode material according to the present invention) is mixed with, for example, a binder, a thickener, an electroconductor and a solvent to be made into the form of slurry, which is then applied to a current collector, dried and pressed to increase its density. As the negative-electrode active material, a negative-electrode material according to the present invention may be used alone, or may be used in combination with any other active material.

The density of the active material layer is within a range of usually 1.40 g/cm$^3$ or higher, preferably 1.50 g/cm$^3$ or higher, more preferably 1.60 g/cm$^3$ or higher in view of increasing battery capacity. Herein, the active material layer means a layer that is formed on a current collector and contains an active material, a binder, and a conductor, and the density of the layer means the density when the electrode is assembled into a battery.

As the binder, any substance can be used as long as it is stable in a solvent used for electrode production and in a liquid electrolyte. Examples are poly vinylidene fluoride, poly tetra fluoroethylene, polyethylene, polypropylene, styrene-butadiene-rubber (SBR), isoprene rubber, butadiene rubber, ethylene-acrylic acid copolymer, and ethylene-methacrylic acid copolymer. These may be used either singly or any two or more in combination at arbitrary ratios.

As the thickener, any substance can be arbitrarily selected and used. Examples are carboxyl methyl cellulose (CMC), methyl cellulose, hydroxymethyl cellulose, ethyl cellulose, poly vinyl alcohol, oxidized starch, phosphatized starch, and casein. These may be used either singly or any two or more in combination at arbitrary ratios.

Examples of the electroconductor are: metal materials, such as copper and nickel; and carbon materials, such as graphite and carbon black. These may be used either singly or any two or more in combination at arbitrary ratios.

Examples of the material for the negative-electrode current collector include copper, nickel, and stainless steel. Preferred among these is a copper foil because of its thin-layer formability and its low cost. These may be used either singly or any two or more in combination at arbitrary ratios.

[3. Lithium Secondary Battery]

The aforementioned negative electrode for a lithium secondary battery can be combined with a positive electrode capable of intercalating and deintercalating lithium and with an electrolyte to form a lithium secondary battery.

The positive electrode may be produced by any method, such as a method similar to the aforementioned method of negative-electrode production, i.e. by forming a layer containing a positive-electrode active material (positive electrode layer) on a current collector.

The positive-electrode active material is composed of a material capable of intercalating and deintercalating lithium, examples of which material include: lithium transition metal composite oxide materials such as lithium cobalt oxide, lithium nickel oxide, and lithium manganese oxide; transition metal oxide materials such as manganese dioxide; and carbonaceous materials such as fluorinated graphite. Concrete examples are $LiFeO_2$, $LiCoO_2$, $LiNiO_2$, and $LiMn_2O_4$, and non-stoichiometric compounds of these compounds, as well as $MnO_2$, $TiS_2$, $FeS_2$, $Nb_3S_4$, $Mo_3S_4$, $COS_2$, $V_2O_5$, $P_2O_5$, $CrO_3$, $V_3O_3$, $TeO_2$, and $GeO_2$.

The positive-electrode current collector is preferably composed of a material selected from valve metals and their alloys, because it forms a passive-state film on the positive-electrode surface through oxidation in a liquid electrolyte. Examples of valve metals include metals belonging to any one of Group IIIb, Group IVa, and Group Va (3B, 4A, and 5A), as well as their alloys. Concrete examples include Al, Ti, Zr, Hf, Nb, and Ta, and alloys containing any of these metals, among which Al, Ti, and Ta, and alloys containing any of these metals can be preferably used. Especially preferable are Al and its alloys because they are lightweight and can therefore exhibit high energy density.

The electrolyte may be in any forms, either a liquid electrolyte or a solid electrolyte. As used herein, the electrolyte is a generic term for all the ionic conductors, including both liquid electrolytes and solid electrolytes.

An example of usable liquid electrolytes is a solution in which a solute is dissolved in a nonaqueous solvent. Examples of the solute are alkali metal salts and quaternary ammonium salts. Specifically, it is preferred to use one or more compounds selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, and $LiC(CF_3SO_2)_3$.

Examples of the usable nonaqueous solvent are: cyclic carbonates such as ethylene carbonate, propylene carbonate, butylene carbonate, and vinylene carbonate; cyclic ester compounds such as γ-utyrolactone; chain ethers such as 1,2-dimethoxyethane; cyclic ethers such as crown ethers, 2-methyl tetra hydrofuran, 1,2-dimethyl tetra hydrofuran, 1,3-dioxolane, and tetra hydrofuran; chain carbonates such as diethyl carbonate, ethyl methyl carbonate, and dimethyl carbonate. These examples for the solute and for the solvent may be used either singly or in combination of any two or more at an arbitrary mixing ratio. Preferable among these is a nonaqueous solution containing at least one cyclic carbonate and at least one chain carbonate.

Alternatively, the nonaqueous liquid electrolyte may be in the form of gel or rubber prepared by adding an organic polymer compound to the liquid electrolyte, or may be a solid electrolyte in the form of a solid sheet. Examples of the organic polymer are: polyether polymer compounds such as poly ethylene oxide and poly propylene oxide; cross-linked polymers derived from the polyether polymer compounds; vinyl alcohol polymer compounds such as polyvinyl alcohol and polyvinyl butyral; insolubilized compounds derived from the vinyl alcohol polymer compounds; polyepichlorohydrin; polyphosphazene; polysiloxane; vinyl polymer compounds such as poly vinyl pyrrolidone, polyvinylidene carbonate, and polyacrylonitrile; and polymer copolymers such as poly (ω-methoxy origo oxyethylene methacrylate) and poly(ω-methoxy origo oxyethylene methacrylate-co-methyl methacrylate).

In addition to the liquid electrolyte, the negative electrode, and the positive electrode, the lithium secondary battery may also contain, for example, an outer case, a separator, a gasket, a sealing pad, and a cell case.

The separator is not limited particularly either in its material or shape. The separator is used for separating the positive electrode from the negative electrode to avoid physical contact between these electrodes, being preferably made of a material with high ion permeability and low electric resistance. The separator is preferably composed of a material that is stable in the liquid electrolyte and superior in water-retaining characteristics. A concrete example is a porous sheet or nonwoven fabric made of polyolefin, such as polyethylene or polypropylene, and impregnated with the liquid electrolyte.

An example of the method of producing a lithium secondary battery includes: disposing a negative electrode into an outer case; disposing a liquid electrolyte and a separator on the negative electrode; disposing a positive electrode in such a position that the positive electrode faces the negative electrode; and caulking the outer case together with a gasket and a sealing pad.

The battery is not limited particularly in its shape, examples of which are: cylinder type, in which sheet electrodes and a separator are made in the form of spirals; inside-out cylinder type, in which pellet electrodes and a separator are combined; and coin type, in which pellet electrodes and a separator are layered.

EXAMPLES

Next, the present invention will be explained in further detail by means of Examples. However, the present invention should by no means be limited by these Examples, unless it departs from the gist of the invention.

Example 1

A purified scale-like natural graphite (ash content: 0.05 weight %) with a diameter of about 150 μm was spheroidized at a rotational speed of 6500 rpm for five minutes by means of a spheroidization apparatus (Hybridization System manufactured by Nara Machinery Co., Ltd.). Fine particles in 45 weight % were removed by means of an air classifier (OMC-100 manufactured by Seishin Enterprise Co., Ltd.) to prepare a spheroidized graphite powder with a volume-based average diameter (=median diameter) of 17 μm, a tap density of 1.0 g/cm$^3$, and a BET specific surface area of 7.5 m$^2$/g. The values of the volume-based average diameter (=median diameter), tap density, and BET specific surface area were obtained in accordance with the aforementioned methods.

The spheroidized graphite powder after classification was packed in a graphite crucible and graphitized under inert atmosphere at 3000° C. for 5 hours by means of a direct-type electric kiln to produce graphite powder (the negative-electrode material of Example 1).

The negative-electrode material of Example 1 was measured for its properties; the results were that the median diameter was 17 μm, $d_{90}/d_{10}$=2.5, the tap density was 11.0 g/cm$^3$, the amount of surface functional groups, O/C value, <0.001, the BET specific surface area was 5.4 m$^2$/g, the Raman R value was 0.03, the Raman half-value width was 20.5 cm$^{-1}$, and the degree of circularity was 0.94. The values of the amount of surface functional groups O/C value, Raman R value, Raman half-value width, and degree of circularity were obtained in accordance with the aforementioned methods.

Also, the negative-electrode material of Example 1 was measured for its crystallinity in accordance with X-ray diffraction; the results were that $d_{002}$=0.3354 nm, $Lc_{004}$>1000 Å (100 nm).

Further, the negative-electrode material of Example 1 was made into an electrode with an electrode density of 1.63±0.05 g/cm$^3$ in accordance with the method explained below. The active-material orientation ratio of the resultant electrode was determined to be 0.05. The pressing load applied in electrode formation was 60 kg.

Table 1 shows the evaluation results of the properties of the negative-electrode material of Example 1.

The negative-electrode material of Example 1 was also employed in assembling a lithium secondary battery in accordance with the method explained below. The resultant lithium secondary battery was measured for its discharge capacity, charge-discharge efficiency, and load characteristics. Also, another lithium secondary battery was produced similarly, charged and then disassembled. The thickness of the resultant electrode was measured to determine the rate of swelling during charging.

<Method of Electrode Production>

A graphite material was mixed with an aqueous solution of CMC as a thickener and an aqueous solution of SBR as a binder resin, in such a manner that each of the CMC and SBR contents became 1 weight % relative to the total weight of the mixture of graphite material, CMC, and SBR after being dried. The mixture is stirred and made into the form of slurry, which is then applied on a copper foil. The gap defining the thickness for application was adjusted such that the electrode weight (exclusive of the copper foil) became 10 mg/cm$^2$ after being dried.

The electrode was dried at 80° C., and then pressed such that the electrode density (exclusive of the copper foil) became 1.63±0.05 g/cm$^3$. From the electrode after pressed, an electrode of 12 mm in diameter was stamped out. Based on its weight, the weight of the negative-electrode active material was calculated in accordance with the following equation.

(the weight of the negative-electrode active material)=
(the weight of the electrode)−(the weight of the
copper foil)−(the weight of the binder)

<Method of Measurement for Pressing Load in Electrode Formation>

Pressing was carried out with a roll press of 20 cm in diameter in such a manner that the electrode density (exclusive of the copper foil) became 1.63±0.05 g/cm$^3$. During the pressing, the pressing load (linear load) was read from the load cell to determine the pressing load in electrode formation (the load per centimeter width of the electrode).

<Method of Lithium-Secondary-Battery Production>

An electrode produced in accordance with the aforementioned method of electrode production was vacuum-dried at 110° C., then transferred to a globe box and subjected to assemblage of a coin battery (lithium secondary battery) under argon atmosphere, together with a 1M-LiPF$_6$ liquid electrolyte whose solvent is a liquid mixture of ethylene carbonate (EC)/diethyl carbonate (DEC)=1/1, a polyethylene separator and a lithium-metal counter electrode.

<Method of Discharge-Capacity Measurement>

The lithium counter electrode was charged with a current density of 0.2 mA/cm$^2$ to 5 mV, and then charged with a constant voltage of 5 mV until the current value reached 0.02 mA, to thereby dope the negative electrode with lithium. After that, the lithium counter electrode was discharged with a current density of 0.4 mA/cm$^2$ to 1.5V. This charge-discharge cycle was repeated for three cycles, and the discharge value in the third cycle was obtained as the discharge capacity.

<Method of Calculating Charge-Discharge Efficiency>

The efficiency was calculated during the discharge-capacity measurement in accordance with the following:

Charge-discharge efficiency (%)={initial discharge
capacity (mAh/g)/initial charge capacity
(mAh/g)}×100

<Method of Calculating Load Characteristics>

Subsequent to the discharge-capacity measurement, the battery was charged similarly, and then discharged with a current density of 6.0/cm$^2$. The load characteristics were calculated in accordance with the following:

2 C discharge capacity (mAh/g): discharge capacity when discharged with a current density of 6.0 mA/cm$^2$.

0.2 C discharge capacity (mAh/g): discharge capacity when discharged with a current density of 0.6 mA/cm$^2$.

Load characteristics (%)={2 C discharge capacity (mAh/g)/0.2 C discharge capacity (mAh/g)}×100

<Method of Measurement for the Rate of Swelling During Charging>

Subsequent to the third charge-discharge cycle in the discharge-capacity measurement, the charge in the fourth cycle was carried out with the termination condition of a constant capacity of 300 mAh/g. The coin battery in a charged state was disassembled in an argon globe box in such a manner as to avoid accidental shortings. The electrode was taken out and measured for the thickness in a charged state (exclusive of the copper foil). With reference to the thickness of the electrode pressed before battery production (exclusive of the copper foil), the rate of swelling during charging was calculated in accordance with the following equation.

The rate of swelling during charging (%)={(charge electrode thickness)−(press electrode thickness)}/ (press electrode thickness)×100

Also, with the negative-electrode material of Example 1, a lithium secondary battery was assembled in accordance with the following method, and measured for the amount of gas generation.

<Method of Producing Electrode for Measurement of the Amount of Gas Generation>

Like the aforementioned method of electrode production, the slurry was applied onto a copper foil with a doctor blade. The gap defining the thickness for application was adjusted in such a manner that the electrode weight (exclusive of the copper foil) became 15 mg/cm$^2$ after being dried.

The electrode was dried at 80° C., and then pressed such that the electrode density (exclusive of the copper foil) became 1.80±0.05 g/cm$^3$. From the electrode after pressed, an electrode of 12 mm in diameter was stamped out. Based on its weight, the weight of the negative-electrode active material was calculated in accordance with the following equation.

(the weight of the negative-electrode active material)= (the weight of the electrode)−(the weight of the copper foil)−(the weight of the binder)

<Method of Producing Lithium Secondary Battery for Measurement of the Amount of Gas Generation>

A lithium secondary battery was assembled according to the aforementioned method of lithium secondary battery production, except for that an assembly-type cell equipped with a valve and having a constant cell volume was used instead of a coin battery.

<Method of Measurement for the Amount of Gas Generation>

The lithium counter electrode was charged to 0 mV with a current density of 0.2 mA/cm$^2$ to dope the negative electrode with lithium, after which the lithium counter electrode was discharged to 1.5V with a current density of 0.5 mA/cm$^2$. The amount of gas generated was then obtained by means of gas chromatography with helium gas as a carrier. Hydrogen, carbon monoxide, and methane gas were separated and analyzed with a molecular sieve, and carbon dioxide, saturated and unsaturated C2 to C4 hydrocarbons were separated and analyzed with a PLOT column Q, to determine the amount (concentration) of generated gas.

Table 1 shows the evaluation results of the properties of the negative-electrode material of Example 1.

Example 2

A purified scale-like natural graphite (ash content 0.03 weight %) with a diameter of about 150 μm was spheroidized at a rotational speed of 5000 rpm for three minutes by means of the same spheroidization apparatus as used in Example 1. Fine particles in 15 weight % were removed by means of an air classifier (OMC-100 manufactured by Seishin Enterprise Co., Ltd.) to prepare a spheroidized graphite powder with a median diameter of 23 μm, a tap density of 11.0 g/cm$^3$, a BET specific surface area of 6 m$^2$/g. The values of the volume-based average diameter, tap density, and BET specific surface area were obtained in accordance with the aforementioned methods.

The spheroidized graphite powder after classification was heat-treated similarly to Example 1, and the obtained negative-electrode material of Example 2 was measured for its properties; the results were that the median diameter was 23 μm, $d_{90}/d_{10}$=2.5, the tap density was 1.0 g/cm$^3$, the amount of surface functional groups, O/C value, <0.001, the BET specific surface area was 4.5 m$^2$/g, the Raman R value was 0.03, the Raman half-value width was 20.0 cm$^{-1}$, and the degree of circularity was 0.93. The values of the amount of surface functional groups O/C value, Raman R value, Raman half-value width, and the degree of circularity were obtained in accordance with the aforementioned methods.

The negative-electrode material of Example 2 was also measured for its crystallinity in accordance with X-ray diffraction; the results were that $d_{002}$=0.3354 nm, $Lc_{004}$>1000 Å (100 nm).

Further, the negative-electrode material of Example 2 was made into an electrode for measurement of the active-material orientation ratio, which was determined to be 0.05. The pressing load applied in electrode formation was 40 kg.

Employing the negative-electrode material of Example 2, a lithium secondary battery was assembled similarly to Example 1, and measured for the discharge capacity, the charge-discharge efficiency, the load characteristics, the rate of swelling during charging, and the amount of gas generation.

Table 1 shows the evaluation results of the properties of the negative-electrode material of Example 2.

Example 3

A purified scale-like natural graphite (ash content 0.1 weight %) with a diameter of about 160 μm was pulverized at a rotational speed of 5000 rpm for three minutes by means of the same pulverizer as that of Example 1. Fine particles in 20 weight % were removed by means of an air classifier (OMC-100 manufactured by Seishin Enterprise Co., Ltd.) to prepare a spheroidized graphite powder with a median diameter of 22 μm, a tap density of 0.9 g/cm$^3$, and a BET specific surface area of 5.8 m$^2$/g. The values of the volume-based average diameter, tap density, and BET specific surface area were obtained in accordance with the aforementioned methods.

The spheroidized graphite powder after classification was heat-treated similarly to Example 1, and the obtained negative-electrode material of Example 3 was measured for its properties; the results were that the median diameter was 22 μm, $d_{90}/d_{10}$=2.7, the tap density was 0.9 g/cm$^3$, the amount of surface functional groups, O/C value, <0.001, the BET specific surface area was 4.5 m$^2$/g, the Raman R value was 0.03, the Raman half-value width was 20.3 cm$^{-1}$, and the degree of circularity was 0.92. The values of the amount of surface functional groups O/C value, Raman R value, Raman half-value width, and the degree of circularity were obtained in accordance with the aforementioned methods.

The negative-electrode material of Example 3 was also measured for its crystallinity in accordance with X-ray diffraction; the results were that $d_{002}=0.3354$ nm, $Lc_{004}>1000$ Å (100 nm).

Further, the negative-electrode material of Example 2 was made into an electrode for measurement of the active-material orientation ratio, which was determined to be 0.03. The pressing load applied in electrode formation was 36 kg.

Employing the negative-electrode material of Example 3, a lithium secondary battery was assembled similarly to Example 1, and measured for the discharge capacity, the charge-discharge efficiency, the load characteristics, the rate of swelling during charging, and the amount of gas generation.

Table 1 shows the evaluation results of the properties of the negative-electrode material of Example 3.

Example 4

Procedures were carried out similarly to Example 1 except that the spheroidized graphite powder was heat-treated at a temperature of 2000° C. The negative-electrode material of Example 4 obtained was measured for its properties; the results were that the median diameter was 17 μm, $d_{90}/d_{10}=2.5$, the tap density was 11.0 g/cm³, the amount of surface functional groups, O/C value, <0.001, the BET specific surface area was 5.7 m²/g, the Raman R value was 0.04, the Raman half-value width was 21.0 cm⁻¹, and the degree of circularity was 0.94. The values of the median diameter, tap density, BET specific surface area, the amount of surface functional groups O/C value, Raman R value, Raman half-value width, and the degree of circularity were obtained in accordance with the aforementioned methods.

The negative-electrode material of Example 4 was also measured for its crystallinity in accordance with X-ray diffraction; the results were that $d_{002}=0.3354$ nm, $Lc_{004}>1000$ Å (100 nm).

Further, the negative-electrode material of Example 4 was made into an electrode for measurement of the active-material orientation ratio, which was determined to be 0.05. The pressing load applied in electrode formation was 62 kg.

Employing the negative-electrode material of Example 4, a lithium secondary battery was assembled similarly to Example 1, and measured for the discharge capacity, the charge-discharge efficiency, the load characteristics, the rate of swelling during charging, and the amount of gas generation.

Table 1 shows the evaluation results of the properties of the negative-electrode material of Example 4.

Example 5

50 weight % of the spheroidized graphite powder obtained after the heat treatment in Example 1 was mixed with 50 weight % of a spheroidized natural graphite powder with a median diameter of 21 μm, at a p density of 0.9 g/cm³, an amount of surface functional groups, O/C value, of 0.030, a BET specific surface area of 6.0 m²/g, a Raman R value of 0.18, a Raman half-value width of 22.0 cm⁻¹, and a degree of circularity of 0.92, for 30 minutes by means of a rotary mixer.

The negative-electrode material of Example 5 obtained after mixing was measured for the properties; the results were that the median diameter was 19 μm, $d_{90}/d_{10}=2.5$, the tap density was 1.0 g/cm³, the amount of surface functional groups, O/C value, was 0.015, the BET specific surface area was 5.7 m²/g, the Raman R value was 0.011, the Raman half-value width was 21.3 cm⁻¹, and the degree of circularity was 0.94. The values of the median diameter, tap density, BET specific surface area, the amount of surface functional groups O/C value, Raman R value, Raman half-value width, and the degree of circularity were obtained in accordance with the aforementioned methods.

The negative-electrode material of Example 5 was also measured for its crystallinity in accordance with X-ray diffraction; the results were that $d_{002}=0.3354$ nm, $Lc_{004}>1000$ Å (100 nm).

Further, the negative-electrode material of Example 5 was made into an electrode for measurement of the active-material orientation ratio, which was determined to be 0.04. The pressing load applied in electrode formation was 48 kg.

Employing the negative-electrode material of Example 5, a lithium secondary battery was assembled similarly to Example 1, and measured for the discharge capacity, the charge-discharge efficiency, the load characteristics, the rate of swelling during charging, and the amount of gas generation.

Table 1 shows the evaluation results of the properties of the negative-electrode material of Example 5.

Example 6

40 weight % of the negative-electrode material of Example 2 was mixed with 60 weight % of a carbon material (b), in which a spheroidized natural graphite with a median diameter of 13 μm, a tap density of 11.0 g/cm³, and a BET specific surface area of 7.5 m²/g was covered partially or whole with a heat-treated petroleum soft pitch, to prepare the negative-electrode material of Example 6.

The negative-electrode material of Example 6 was measured for its properties; the results were that the median diameter was 18 μm, $d_{90}/d_{10}=2.6$, the tap density was 1.16 g/cm³, the amount of surface functional groups, O/C value, <0.001, the BET specific surface area was 2.6 m²/g, the Raman R value was 0.09, and the Raman half-value width was 21.5 cm⁻¹. The values of the median diameter, tap density, BET specific surface area, the amount of surface functional groups O/C value, Raman R value, Raman half-value width, and the degree of circularity were obtained in accordance with the aforementioned methods.

The negative-electrode material of Example 6 was also measured for its crystallinity in accordance with X-ray diffraction; the results were that $d_{002}=0.3354$ nm, $Lc_{004}>1000$ Å (100 nm).

Further, the negative-electrode material of Example 6 was made into an electrode for measurement of the active-material orientation ratio, which was determined to be 0.05. The pressing load applied in electrode formation was 70 kg.

Employing the negative-electrode material of Example 6, a lithium secondary battery was assembled similarly to Example 1, and measured for the discharge capacity, the charge-discharge efficiency, the load characteristics, the rate of swelling during charging, and the amount of gas generation.

Table 1 shows the evaluation results of the properties of the negative-electrode material of Example 6.

Comparative Example 1

A purified scale-like natural graphite (ash content 0.1 weight %) with a median diameter of 17 μm, a tap density of 0.5 g/cm³, and a BET specific surface area of 6 m²/g was heat-treated similarly to Example 1, without being spheroidized. The negative-electrode material of Comparative Example 1 obtained was measured for its properties; the results were that the median diameter was 17 μm, $d_{90}/d_{10}$=4.5, the tap density was 0.3 g/cm$^3$, the amount of surface functional groups, O/C value, <0.001, the BET specific surface area was 4.7 m$^2$/g, the Raman R value was 0.04, the Raman half-value width was 25.0 cm$^{-1}$, and the degree of circularity was 0.82. The values of the median diameter, tap density, BET specific surface area, the amount of surface functional groups O/C value, Raman R value, Raman half-value width, and the degree of circularity were obtained in accordance with the aforementioned methods.

The negative-electrode material of Comparative Example 1 was also measured for its crystallinity in accordance with X-ray diffraction; the results were that $d_{002}$=0.3354 nm, $Lc_{004}$>1000 Å (100 nm).

Further, the negative-electrode material of Comparative Example 1 was made into an electrode, although the applied film became nonuniform in electrode formation, and came off from the copper foil after being pressed, so that the measurement of battery characteristics was impossible.

Table 1 shows the evaluation results of the properties of the negative-electrode material of Comparative Example 1.

Comparative Example 2

A purified natural graphite (ash content 0.5 weight %) with a median diameter of 20 μm, a tap density of 0.75 g/cm$^3$, and a BET specific surface area of 3 m$^2$/g heat-treated similarly to Example 1, without being spheroidized. The negative-electrode material of Comparative Example 2 obtained was measured for its properties; the results were that the median diameter was 20 μm, $d_{90}/d_{10}$=7.7, the tap density was 0.7 g/cm$^3$, the amount of surface functional groups, O/C value, <0.001, the BET specific surface area was 4 m$^2$/g, the Raman R value was 0.03, the Raman half-value width was 20.2 cm$^{-1}$, and the degree of circularity was 0.86. The values of the median diameter, tap density, BET specific surface area, the amount of surface functional groups O/C value, Raman R value, Raman half-value width, the degree of circularity were obtained in accordance with the aforementioned methods.

The negative-electrode material of Comparative Example 2 was also measured for its crystallinity in accordance with X-ray diffraction; the results were that $d_{002}$=0.3354 nm, $Lc_{004}$>1000 Å (100 nm).

Further, the negative-electrode material of Comparative Example 2 was made into an electrode for measurement of the active-material orientation ratio, which was determined to be 0.02. The pressing load applied in electrode formation was 30 kg.

Employing the negative-electrode material of Comparative Example 2, a lithium secondary battery was assembled similarly to Example 1, and measured for the discharge capacity, the charge-discharge efficiency, the load characteristics, the rate of swelling during charging, and the amount of gas generation.

Table 1 shows the evaluation results of the properties of the negative-electrode material of Comparative Example 2.

Comparative Example 3

Procedures were carried out similarly to Example 1 except that the spheroidized graphite powder was heat-treated at a temperature of 1200° C. The negative-electrode material of Comparative Example 3 obtained was measured for its properties; the results were that the median diameter was 17 μm, $d_{90}/d_{10}$=2.5, the tap density was 11.0 g/cm$^3$, the amount of surface functional groups, O/C value, <0.001, the BET specific surface area was 6.5 m$^2$/g, the Raman R value was 0.14, the Raman half-value width was 22.5 cm$^{-1}$, and the degree of circularity was 0.94. The values of the median diameter, tap density, BET specific surface area, the amount of surface functional groups O/C value, Raman R value, Raman half-value width, the degree of circularity were obtained in accordance with the aforementioned methods.

The negative-electrode material of Comparative Example 3 was also measured for its crystallinity in accordance with X-ray diffraction; the results were that $d_{002}$=0.3354 nm, $Lc_{004}$>1000 Å (100 nm).

Further, the negative-electrode material of Comparative Example 3 was made into an electrode for measurement of the active-material orientation ratio, which was determined to be 0.05. The pressing load applied in electrode formation was 58 kg.

Employing the negative-electrode material of Comparative Example 3, a lithium secondary battery was assembled similarly to Example 1, and measured for the discharge capacity, the charge-discharge efficiency, the load characteristics, the rate of swelling during charging, and the amount of gas generation.

Table 1 shows the evaluation results of the properties of the negative-electrode material of Comparative Example 3.

Comparative Example 4

Procedures were carried out similarly to Example 1 except that the heat treatment to the spheroidized graphite powder was omitted. The negative-electrode material of Comparative Example 4 obtained was measured for its properties; the results were that the median diameter was 17 μm, $d_{90}/d_{10}$=2.5, the tap density was 11.0 g/cm$^3$, the amount of surface functional groups, O/C value, was 0.032, the BET specific surface area was 7.5 m$^2$/g, the Raman R value was 0.27, the Raman half-value width was 23.5 cm$^{-1}$, and the degree of circularity was 0.94. The values of the median diameter, tap density, BET specific surface area, the amount of surface functional groups O/C value, Raman R value, Raman half-value width, and the degree of circularity were obtained in accordance with the aforementioned methods.

The negative-electrode material of Comparative Example 4 was also measured for its crystallinity in accordance with X-ray diffraction; the results were that $d_{002}$=0.3354 nm, $Lc_{004}$>1000 Å (100 nm).

Further, the negative-electrode material of Comparative Example 4 was made into an electrode for measurement of the active-material orientation ratio, which was determined to be 0.05. The pressing load applied in electrode formation was 56 kg.

Employing the negative-electrode material of Comparative Example 4, a lithium secondary battery was assembled similarly to Example 1, and measured for the discharge capacity, the charge-discharge efficiency, the load characteristics, the rate of swelling during charging, and the amount of gas generation.

Table 1 shows the evaluation results of the properties of the negative-electrode material of Comparative Example 4.

Comparative Example 5

Procedures were carried out similarly to Example 1 except that instead of the spheroidized scale-like natural graphite powder, an artificial graphite in spherical shape (mesocarbon microbeads) was used, and heat-treated similarly to Example 1. The negative-electrode material of Comparative Example 5 obtained was measured for its properties; the results were that the median diameter was 17 μm, $d_{90}/d_{10}$=3.5, the tap density was 1.45 g/cm³, the amount of surface functional groups, O/C value, was 0.002, the BET specific surface area was 1.1 m²/g, the Raman R value was 0.25, the Raman half-value width was 24.5 cm⁻¹, and the degree of circularity was 0.96. The values of the median diameter, tap density, BET specific surface area, the amount of surface functional groups O/C value, Raman R value, Raman half-value width, and the degree of circularity were obtained in accordance with the aforementioned methods.

The negative-electrode material of Comparative Example 5 was also measured for its crystallinity in accordance with X-ray diffraction; the results were that $d_{002}$=0.3360 nm, $Lc_{004}$=690 nm.

Further, the negative-electrode material of Comparative Example 5 was made into an electrode for measurement of the active-material orientation ratio, which was determined to be 0.12. The pressing load applied in electrode formation was 400 kg.

Employing the negative-electrode material of Comparative Example 5, a lithium secondary battery was assembled similarly to Example 1, and measured for the discharge capacity, the charge-discharge efficiency, the load characteristics, the rate of swelling during charging, and the amount of gas generation.

Table 1 shows the evaluation results of the properties of the negative-electrode material of Comparative Example 5.

Comparative Example 6

The spheroidized graphite powder obtained after the heat treatment in Example 1 was oxidized with ozone gas to prepare the negative-electrode material of Comparative Example 6. The negative-electrode material of Comparative Example 6 obtained was measured for its properties; the results were that the median diameter was 17 μm, $d_{90}/d_{10}$=2.5, the tap density was 11.0 g/cm³, the amount of surface functional groups, O/C value, was 0.045, the BET specific surface area was 5.5 m²/g, the Raman R value was 0.03, the Raman half-value width was 20.6 cm⁻¹, and the degree of circularity was 0.94.

The values of the median diameter, tap density, BET specific surface area, the amount of surface functional groups O/C value, Raman R value, Raman half-value width, and the degree of circularity were obtained in accordance with the aforementioned methods.

The negative-electrode material of Comparative Example 6 was also measured for its crystallinity in accordance with X-ray diffraction; the results were that $d_{002}$=0.3354 nm, $Lc_{004}$>1000 Å (100 nm).

Further, the negative-electrode material of Comparative Example 6 was made into an electrode for measurement of the active-material orientation ratio, which was determined to be 0.05. The pressing load applied in electrode formation was 58 kg.

Employing the negative-electrode material of Comparative Example 6, a lithium secondary battery was assembled similarly to Example 1, and measured for the discharge capacity, the charge-discharge efficiency, the load characteristics, the rate of swelling during charging, and the amount of gas generation.

Table 1 shows the evaluation results of the properties of the negative-electrode material of Comparative Example 6.

TABLE 1

| | Properties of Negative-Electrode Materials | | | | | | Evaluation Results of Negative-Electrode Materials | | | | | |
|---|---|---|---|---|---|---|---|---|---|---|---|---|
| | Tap Density (g/cm³) | BET Specific Surface Area (m²/g) | Raman R Value | Raman Half-Value Width (cm⁻¹) | Amount of Surface Functional Groups O/C Value | Volume-Based Average Particle Diameter (μm) | Pressing Load (kg) | Discharge Capacity (mAh/g) | Charge-Discharge Efficiency (%) | Load Characteristics (%) | Amount of Swelling during Charging (%) | Amount of Gas Generated (ppm) |
| Example 1 | 1.0 | 5.4 | 0.03 | 20.5 | <0.001 | 17 | 60 | 360 | 91 | 85 | 34 | 5300 |
| Example 2 | 1.0 | 4.5 | 0.03 | 20.0 | <0.001 | 23 | 40 | 361 | 93 | 85 | 36 | 5200 |
| Example 3 | 0.9 | 4.5 | 0.03 | 20.3 | <0.001 | 22 | 36 | 360 | 93 | 82 | 40 | 5200 |
| Example 4 | 1.0 | 5.7 | 0.04 | 21.0 | <0.001 | 17 | 62 | 364 | 91 | 85 | 34 | 5600 |
| Example 5 | 1.0 | 5.7 | 0.11 | 21.3 | 0.015 | 19 | 48 | 361 | 91 | 83 | 37 | 5200 |
| Example 6 | 1.16 | 2.6 | 0.09 | 21.5 | <0.001 | 18 | 70 | 360 | 92 | 86 | 40 | 6800 |
| Comparative Example 1 | 0.3 | 4.7 | 0.04 | 25.0 | <0.001 | 17 | came off from the copper foil after being pressed, so that the measurement of battery characteristics was impossible. | | | | | |
| Comparative Example 2 | 0.7 | 4.0 | 0.03 | 22.9 | <0.001 | 20 | 50 | 362 | 92 | 65 | 48 | 5100 |
| Comparative Example 3 | 1.0 | 6.5 | 0.14 | 22.5 | <0.001 | 17 | 58 | 362 | 90 | 85 | 34 | 6300 |
| Comparative Example 4 | 1.0 | 7.5 | 0.27 | 23.5 | 0.032 | 17 | 56 | 359 | 88 | 81 | 36 | 7000 |
| Comparative Example 5 | 1.4 | 1.1 | 0.12 | 24.5 | 0.002 | 17 | 400 | 329 | 90 | 88 | 23 | 5600 |
| Comparative Example 6 | 1.0 | 5.5 | 0.03 | 20.6 | 0.045 | 17 | 58 | 361 | 91 | 85 | 34 | 6500 |

(Note: The properties of the negative-electrode materials of Example 5 and Example 6 are shonwn as the values of the negative-electrode materials after mixed.)

As shown in Table 1, in the negative-electrode material of Comparative Example 1, the amount of surface functional groups O/C value, the BET specific surface area, and the Raman R value were within the ranges defined in the present invention, although the tap density fell far below the range defined in the present invention. As a result, the applied film became nonuniform in electrode formation, and came off from the copper foil after being pressed, so that the measurement of battery characteristics was impossible.

In the negative-electrode material of Comparative Example 2, the amount of surface functional groups O/C value, the BET specific surface area, and the Raman R value were within the ranges defined in the present invention, although the tap density fell below the range defined in the present invention, resulting in the low load characteristics and the high rate of swelling during charging.

In the negative-electrode material of Comparative Example 3, the tap density, the amount of surface functional groups O/C value, and the BET specific surface area were within the ranges defined in the present invention, although the Raman R value exceeds the range defined in the present invention, due to low heat-treatment temperature, resulting in the large amount of gas generation.

In the negative-electrode material of Comparative Example 4, only the tap density was within the range defined in the present invention, while the amount of surface functional groups O/C value, the BET specific surface area, and the Raman R value exceed the ranges defined in the present invention due to the omission of heat treatment, resulting in the low charge-discharge efficiency, the large amount of gas generation, and the low load characteristics.

In the negative-electrode material of Comparative Example 5, only the amount of surface functional groups, O/C value, was within the range defined in the present invention because of the heat treatment of the artificial graphite, while the tap density, the BET specific surface area, and the Raman R value fall outside the ranges defined in the present invention, resulting in the large pressing load in electrode formation and the small discharge capacity.

In the negative-electrode material of Comparative Example 6, the tap density, the BET specific surface area, and the Raman R value were within the ranges defined in the present invention, although the amount of surface functional groups, O/C value, exceeds the range defined in the present invention, resulting in the large amount of gas generation.

In contrast to these, in the negative-electrode materials of Examples 1 to 4, all of the tap density, the Raman R value, the amount of surface functional groups O/C value, and the BET specific surface area meet the ranges defined in the present invention. These negative-electrode materials required the low pressing loads in electrode formation, and the produced batteries showed the large discharge capacities, high charge-discharge efficiencies and high load characteristics. Also, the electrodes exhibited the decreased rates of swelling during charging and the reduced amounts of gas generation.

The negative-electrode materials of Example 5 and Example 6 contained the graphite powders that meet the ranges defined in the present invention in amounts of within the defined range. As a result, the negative-electrode materials required the low pressing loads in electrode formation, and the produced batteries showed the large discharge capacities, high charge-discharge efficiencies and high load characteristics. Also, the electrodes exhibited the decreased rates of swelling during charging and the reduced amounts of gas generation.

[Industrial Applicability]

The negative-electrode material for a lithium secondary battery according to the present invention, even when used in high electrode densities, can produce a lithium secondary battery having an excellent balance of various battery characteristics, e.g. requiring only a small magnitude of pressing load for electrode formation, having large discharge capacity and high charge-discharge efficiency, being excellent in load characteristics, exhibiting only a small amount of swelling, and generating only a small amount of gas during battery charging. It can therefore be suitably used in various application fields in which lithium secondary batteries are used, such as the fields of electronic devices.

The method of producing negative-electrode material for a lithium secondary battery according to the present invention can produce the negative-electrode material for a lithium secondary battery stably with efficiency and a low cost. It therefore has great value in the fields of industrial production of lithium secondary batteries.

The present invention has been explained in detail above with reference to the specific embodiments. However, it is evident to those skilled in the art that various modifications can be added thereto without departing from the intention and the scope of the present invention.

The present application is based on both the specifications of Japanese Patent Application No. 2004-193359, filed Jun. 30, 2004, and Japanese Patent Application No. 2005-184856, filed Jun. 24, 2005, and their entireties are incorporated herewith by reference.

The invention claimed is:

1. A negative-electrode material for a lithium secondary battery, comprising a graphite powder (A) having
   a tap density of 0.8 g/cm$^3$ to 1.35 g/cm$^3$,
   an amount of surface functional groups, O/C value, of 0 to 0.01,
   a ratio of volume-based 90% diameter to volume-based 10% diameter ($d_{90}/d_{10}$) is 1.5 to 4.0,
   a BET specific surface area of 2.5 m$^2$/g to 7.0 m$^2$/g, and
   a Raman R value of 0.02 to 0.05,
   wherein the amount of surface functional groups, O/C value, is an atomic concentration ratio O/C (atomic concentration of O/atomic concentration of C) obtained from peak areas of spectra of C1s and O1s according to X-ray photoelectron spectroscopy, and
   the Raman R value is an intensity ratio R ($R=I_B/I_A$) between the intensity $I_A$ of a peak $P_A$ of about 1580 cm$^{-1}$ and the intensity $I_B$ of a peak $P_B$ of about 1360 cm$^{-1}$ according to Raman spectroscopy;
   wherein the graphite powder (A) is produced by heat-treating a graphite consisting essentially of natural graphite to a temperature of 1600° C. to 3200° C.

2. The negative-electrode material of claim 1, wherein the volume-based average diameter of the graphite powder (A) is 10 μm to 50 μm.

3. The negative-electrode material of claim 1, wherein the graphite powder (A) is produced by heat-treating a natural graphite which is a spheroidized graphite powder.

4. The negative-electrode material of claim 1, wherein the graphite powder (A) is a graphitized form of a natural graphite in the shape of a sphere.

5. The negative-electrode material of claim 1, wherein the graphite powder (A) has a degree of circularity of 0.90 or more.

6. The negative-electrode material of claim 1, wherein the ratio of volume-based 90% diameter to volume-based 10% diameter ($d_{90}/d_{10}$) is 2.5 to 2.7.

7. The negative-electrode material of claim 1, wherein the Raman R value of the graphite powder (A) is 0.02 to 0.04.

8. The negative-electrode material of claim 1, wherein the graphite powder (A) is produced by heat-treating natural graphite which is a flaky graphite.

9. The negative-electrode material of claim 1, wherein the graphite powder (A) is produced by heat-treating natural graphite which is a vein graphite.

* * * * *